United States Patent [19]

Kashihara et al.

[11] 4,423,940
[45] Jan. 3, 1984

[54] PHOTOGRAPHIC EQUIPMENT

[75] Inventors: Toshitsugu Kashihara; Hiroshi Iwata; Tsunemi Yoshino, all of Nara; Akitoshi Morioka, Osaka, all of Japan

[73] Assignee: West Electric Co., Ltd., Osaka, Japan

[21] Appl. No.: 338,528

[22] Filed: Jan. 11, 1982

[30] Foreign Application Priority Data

Jan. 20, 1981 [JP] Japan ................................. 55-7675
Jan. 20, 1981 [JP] Japan ................................. 55-7676

[51] Int. Cl.³ ............................................. G03B 15/05
[52] U.S. Cl. ........................................ 354/149; 362/18
[58] Field of Search .................... 354/35, 126–128, 354/139, 145, 149, 195, 197; 362/16–18, 276, 280, 286, 311, 306–308, 318, 319; 350/331 R, 348

[56] References Cited

U.S. PATENT DOCUMENTS

| | | | |
|---|---|---|---|
| 3,738,240 | 6/1973 | Mitani et al. | 354/33 |
| 3,843,231 | 10/1974 | Borel et al. | 350/348 |
| 4,141,059 | 2/1979 | Shiojiri | 362/18 |
| 4,323,952 | 4/1982 | Proske | 362/18 X |
| 4,325,621 | 4/1982 | Iwata et al. | 354/145 |

Primary Examiner—William B. Perkey
Attorney, Agent, or Firm—Burgess, Ryan & Wayne

[57] ABSTRACT

A photographic equipment provided with a focal-length sensing means for sensing the focal length of a photographic lens mounted on a camera body and generating the electrical output signal representative of the detected focal length and a beam-angle control means responsive to the output signal from the focal-length sensing means for changing, in response to the detected focal length, the beam angle of an electronic flash unit mounted on the camera body.

6 Claims, 10 Drawing Figures

| A0 | L | L | L |
|---|---|---|---|
| A1 | L | H | L |
| A2 | H | L | L |
|    | c | b | a |

FIG. 6D

| B0 | L | H | L | H | L |
|---|---|---|---|---|---|
| B1 | L | Ha | H | L | L |
| B2 | H | L | L | L | L |
|    | ca | ea | ba | d | aa |

FIG. 7

PHOTOGRAPHIC EQUIPMENT

BACKGROUND OF THE INVENTION

The present invention relates to a photographic equipment capable of changing the beam angle of an electronic flash unit depending upon the focal length of a photographic lens used.

The beam angle and the guide number of the electronic flash unit have a one-to-one correspondence and it is well known in the art that with the same output, if the beam angle is wide, the guide number is small and vice versa. This fact can be advantageously used in flash exposures. That is, if the beam angle of the electronic photoflash unit can be varied depending upon the angle of view, or focal length of a photographic lens used, the energy of flash light can be used with a high degree of efficacy.

There have been proposed various types of means for varying the beam angle of the electronic flash unit. For instance, a suitable projection lens or prism can be detachably mounted in front of the flash lamp to attain a desired beam angle. Alternatively, a projection lens or prism can be mounted in an electronic flash unit in such a way that it can be moved toward or away from the flash lamp thereof depending upon the focal length of a photographic lens used. In some cases, the electrooptical effects are utilized. For instance, as disclosed in Japanese Pat. No. 878,216, a liquid-crystal window is mounted in front of the flash lamp, the window comprising a layer of liquid crystal interposed between a pair of glass plates or the like so that the liquid crystal exhibits the dynamic scattering effect when subjected to the electric field.

However, the use of the projection lens or prism in the manner described above is inconvenient and very often causes an erratic beam-angle setting because the projection lens or prism must be manually mounted or demounted or it must be manually displaced depending upon the focal distance of a photographic lens used which a user must visually check.

In the case of the liquid-crystal window, the voltage applied across the layer of liquid crystal is varied to control the degree of its diffusive transmission. At the present state of the art, however, the sharp variations in degree of diffusive transmission can be attained only within a very limited range. In addition, the characteristics of liquid-crystal windows or devices vary one from another. As a consequence, almost impracticable, complex adjustments would be needed to establish correct one-to-one correspondences between the focal lengths and the degrees of diffusive transmission.

SUMMARY OF THE INVENTION

One of the objects of the present invention is to provide a photographic equipment which can solve the above-described problems.

Another object of the present invention is to provide a photographic equipment provided with a focal-length sensing means for generating the electrical signal representative of the focal length of a photographic lens used and a beam-angle control means responsive to the output signal from the focal-length sensing means for automatically changing the beam angle of an electronic flash unit.

A still another object of the present invention is to provide a photographic equipment of the type described above in which the automatic beam-angle control means which is disposed in front of the flash lamp of an electronic flash unit comprises a plurality of layers of liquid crystal which are selectively caused to exhibit the dynamic scattering effect so that the beam angle can be correctly and automatically controlled in response to the detected focal length of the lens.

A further object of the present invention is to provide a photographic equipment in which a beam-angle control means with a lens or prism is disposed in front of the flash lamp of an electronic flash unit so that the beam angle can be automatically controlled by an electric motor which in turn is controlled by the electric output signal from the focal-length sensing means of the type described above.

Briefly stated, the present invention provides a photographic equipment provided with a focal-length sensing means adapted to generate the electrical output signal representative of the focal length of a photographic lens used or mounted on a camera body and a beam-angle control means which is mounted on an electronic flash unit which in turn is mounted on the camera body and which means is responsive to the electrical output signal from the focal-length sensing means for controlling the beam angle of the flash unit depending upon the detected focal length.

BRIEF DESCRIPTION OF THE DRAWINGS

The same reference numerals are used to designate similar parts throughout the figures.

DESCRIPTION OF THE PREFERRED EMBODIMENTS

Figure 1:
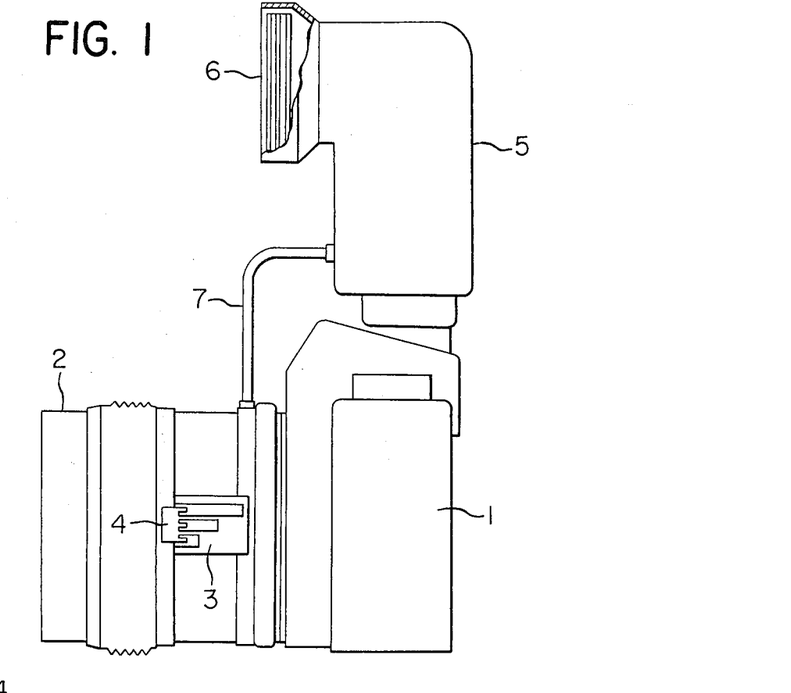
FIG. 1 is a side view of a first embodiment of the present invention.

In FIG. 1 is shown a first embodiment of the present invention. Briefly stated, a liquid-crystal window which is disposed in front of the flash lamp of an electronic flash unit comprises a plurality of layers of liquid crystal which can be selectively driven to produce Williams domains or exhibit the dynamic scattering effect in response to the electrical output signal derived from a focal-length sensing means so that the beam angle of the flash unit can be automatically varied depending upon a detected focal length of a photographic lens used. In the case of a zoom lens, the focal-length sensing means detects the varying focal length in stepwise.

Referring still FIG. 1, reference numeral 1 denotes a camera body; 2, a zoom lens; 3, a focal-length sensor or more precisely a conductor pattern comprising a plurality of parallel conductor strips; 4, a slider adapted to slide over the sensor or conductor pattern 3 and cooperated with the focal-length setting element of the zoom lens 2 to establish desired electrical connection among the conductor strips as will be described in detail below; 5, an electronic flash unit; 6, a liquid-crystal window of the type described above; and 7, a cord for transmitting the electrical output signal from a focal-length sensing means, which comprises the sensor or conductor pattern 3 and the slider 4, to the flash unit 5.

The sensor or conductor pattern 3 and the slider 4 coact to detect the variation in focal length of the zoom lens 2 and produce the electrical output signal which in turn is transmitted through the cord 7 to the flash unit 5. The flash unit 5 includes an electric control circuit which responds to the output signal from the focal-length sensing means 3 and 4 to selectively drive the layers of liquid crystal so that the beam angle can be varied depending upon the detected focal length.

Figure 2:
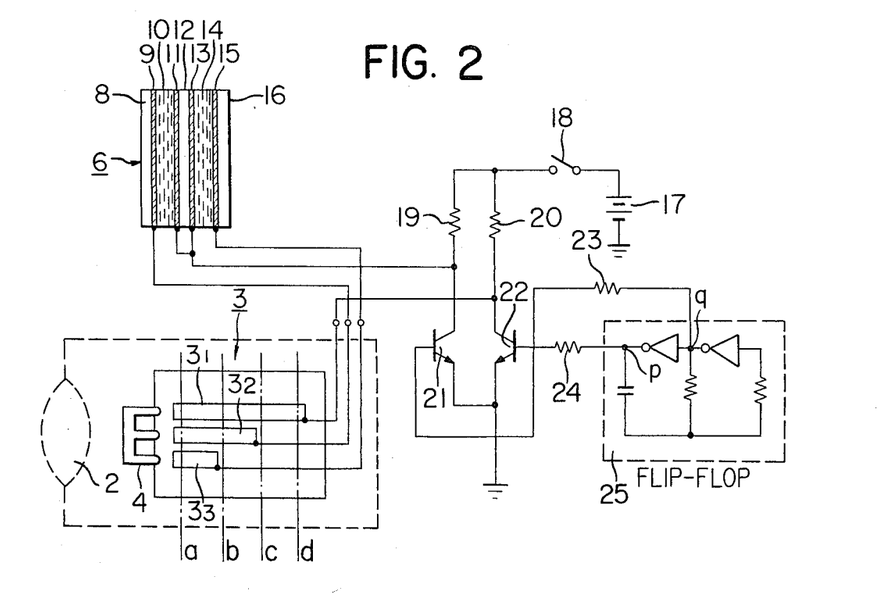
FIG. 2 is the diagram of an electric circuit thereof.

In FIG. 2 is shown the diagram of the electric control circuit. Reference numerals 8, 12 and 16 denote glass plates; 9, 11, 13 and 15, electrodes; 10, molecules of a first Nematic liquid crystal; 14, molecules of a second Nematic liquid crystal; 17, a power supply whose voltage is sufficiently higher than a threshold voltage at which Williams domains are produced in the liquid crystal; 18, a switch ganged with an on-off switch (not shown) of the flash unit 5; 19 and 20, resistors; 21 and 22, driving transistors for energizing the first and second liquid crystals 10 and 14; 23 and 24, resistors; and 25, a flip-flop or the like in which the outputs at the points p and q are opposite in phase.

When the on-off switch of the flash unit 5 is closed, the switch 18 is closed so that the power is supplied from the power supply 17 to the flip-flop 25 and subsequently the outputs opposite in phase appear at the terminal points p and q, respectively. As a result, the transistors 21 and 22 are alternately turned on and off.

The slider 4 which is connected to a zoom handle or the like of the zoom lens 2 slides over the focal-length sensor 3. It is assumed that when the slider 4 slides to the position a, the focal length of the zoom lens 2 is 35 mm; when it slides to the position b, the focal length is 50 mm; when it moves to the position c, the focal length is 60 mm; and if it is positioned at d, the focal length is 70 mm. At the position a, the transistors 21 and 22 are connected to the electrodes 9, 11, 13 and 15 of the liquid-crystal window 6 through the slider 4 which is in contact with conductor strips $3_1$, $3_2$ and $3_3$. The transistors 21 and 22 are connected through the resistors 19 and 20, respectively, and the switch 18 to the power supply 17. When the transistor 21 is turned off, a voltage is applied to the electrodes 11 and 13 and when the transistor 22 is turned off, a voltage is applied to the electrodes 9 and 15. To put into another way, the voltages are alternately applied to the electrodes 9 and 11 and to the electrodes 13 and 15. Therefore, both the first and second liquid crystals are driven into the dynamic scattering state or caused to exhibit the dynamic scattering effect.

When the slider 4 is displaced to the position b, it is out of contact from the conductor strip $3_3$ of the focal-length sensor 3 so that the electrode 15 is floated or disconnected from the collector of the transistor 22. As a result, the second liquid crystal 14 is de-energized and returned to the homogeneous or aligned state. However, since the connection between the transistor 22 and the electrode 9 is maintained through the connection between the conductor strips $3_1$ and $3_2$ by the slider 4, the first liquid crystal 10 remains in the dynamic scattering state.

When the slider 4 is further displaced to the position c, it is out of contact from the conductor strips $3_2$ and $3_3$ so that the electrode 9 is also floated. As a result, the first liquid crystal 10 is also de-energized to return to the homogeneous or aligned state.

When the slider 4 is further moved to the position d, the slider 4 is still out of contact with the conductor strips $3_2$ and $3_3$ so that the first and second liquid crystals 10 and 14 remain in the homogeneous or aligned state.

When the first and second liquid crystals 10 and 14 are in the homogeneous state, they are transparent, but when they are driven into the dynamic scattering state, they scatter the light. The reflector of the flash unit 5 is so designed that it provides an optimum beam angle for a lens with the focal length of 60 mm and the dynamic scattering ratio when two liquid crystals 10 and 14 of the liquid-crystal window 6 is in the dynamic scattering state is selected by, for example, selecting the liquid crystals. Then, when the focal length of the zoom lens 2 varies between 70 and 60 mm, the liquid-crystal window 6 is completely transparent so that the reflector determines the beam angle optimum for a flash exposure through the lens with the focal length of 60 mm. When the focal length varies between 59 and 50 mm, the first liquid crystal 10 is driven into the dynamic scattering state as described above so that the beam angle is adjusted optimum for a flash exposure through a lens with the focal length of 50 mm. When the focal length is between 49 and 35 mm, the first and second liquid crystals 10 and 14 are both driven into the dynamic scattering state; that is, the liquid-crystal window 6 fully scatters the light so that the beam angle is further increased for a flash exposure through a lens with the focal distance of 35 mm.

So far, the liquid-crystal window 6 has been described as comprising two films 10 and 14 of liquid crystals, but it is to be understood that if the number of liquid-crystal films is increased, the beam angle can be more finely adjusted for smaller changes of the focal lens.

A voltage can be applied to the liquid-crystal window 6 from a small-sized and high-voltage cell such as a lithium cell which may be incorporated in a liquid-crystal holder or the like. Alternatively, it may be supplied from the power source incorporated in the flash unit 5. A liquid-crystal window with a built-in cell can be provided in the form of an adapter which can be detachably mounted on the flash unit 5.

In the first embodiment, the movable lens barrel of the zoom lens 2 is assumed to be displaced only in the axial direction, so that the focal-length sensor 3 and the slider 4 are arranged as shown in FIG. 2. However, in some cases, the movable lens barrel of a zoom lens is rotated to vary the focal length. Then, the relationship between the focal-length sensor 3 and the slider 4 must be so changed that a desired electrical connection can be established depending upon the rotation or angular position of the slider 4. In like manner, the relationship must be suitably modified, when photographic lenses with different focal lengths are interchangeably used, in accordance with the focal lengths, respectively. Alternatively, the focal-length sensing means may be in the form of an adapter which can be detachably mounted on a photographic lens. Furthermore, the focal-length sensing means can be mounted on the flash unit 5 instead of the lens 2. More specifically, the flash unit 5 is provided with an electric circuit whose output can be varied in response to the rotation, sliding movement or push-pull of an operating element, so that in response to the output from the circuit, the films of liquid crystal in the window 6 can be selectively energized or driven.

Figures 3, 4:
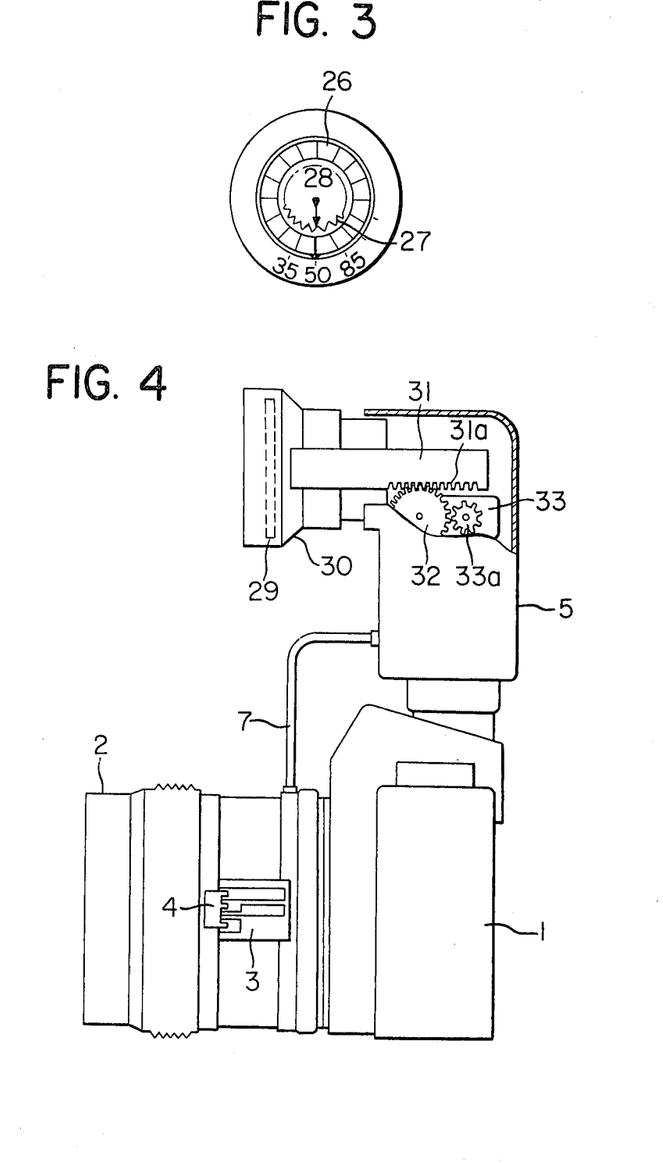
FIG. 3 shows a focal-length sensing means embodying the present invention.
FIG. 4 is a side view, with some parts broken away, of a second embodiment of the present invention.

In FIG. 3 is shown such modification as described above. As a rotating member 26 is rotated, the position of a slider or wiper 28 relative to a resistor element 27 changes so that the resistance between the wiper 28 and one of the resistor element 27 varies and subsequently the magnitude of an electrical signal changes. In addition, the focal lengths of lenses are marked on the rotating member 26 and an outside wall surface of the flash unit as shown. Thus, a photographic equipment adapted for versatile uses can be provided.

In summary, according to the first embodiment of the present invention, the electrical signal is generated which represents the focal length of a photographic lens mounted on the camera body or the like and in response to this signal two or more liquid-crystal films in the liquid-crystal window of the flash unit are selectively energized so that the beam angle can be automatically changes to an optimum value depending upon the focal length of the lens used. As a result, the use of adapters of the types described previously can be eliminated.

In addition, two or more liquid-crystal films are used so that complex electrical adjustments can be eliminated. Furthermore, the electric processing is employed so that the beam angle can be immediately and correctly adjusted depending upon the focal length of a photographic lens used. Thus, the present invention provides a photographic equipment which is easy to operate and is extremely useful in practice.

In FIG. 4 is shown a second embodiment of the present invention which is substantially similar to the first embodiment as shown in FIG. 1 except the additional arrangement to be described below. Reference numeral 29 designates a projection or condenser lens; 30, a movable hood; 31, a supporting arm or rack extended from the outside wall of the movable hood 30 and formed with teeth $31_a$; 32, a pinion in mesh with the rack 31; and 32, an electric motor.

As with the first embodiment, the second embodiment will be described in conjunction with the zoom lens 2. As described above, the variation in focal length of the zoom lens 2 is sensed by the coaction of the focal-length sensor 3 and the slider 4. The signal representative of the detected focal length is transmitted through the cord 7 to the flash unit and drives the motor 33. The driving gear $33_a$ carried at the end of the shaft of the motor 33 is in mesh with the pinion 32 which in turn is in mesh with the teeth $31a$. Therefore, the rotation of the motor 33 is translated into the linear motion of the arm 31 so that the movable hood 30 is moved forward or backward. As a result, the projection or condenser lens 29 on the movable hood 30 is shifted forward or backward so that the distance between the lens 29 and a flash lamp (not shown) is varied and subsequently the beam angle is varied depending upon the detected focal length of the zoom lens 2.

Figure 5:
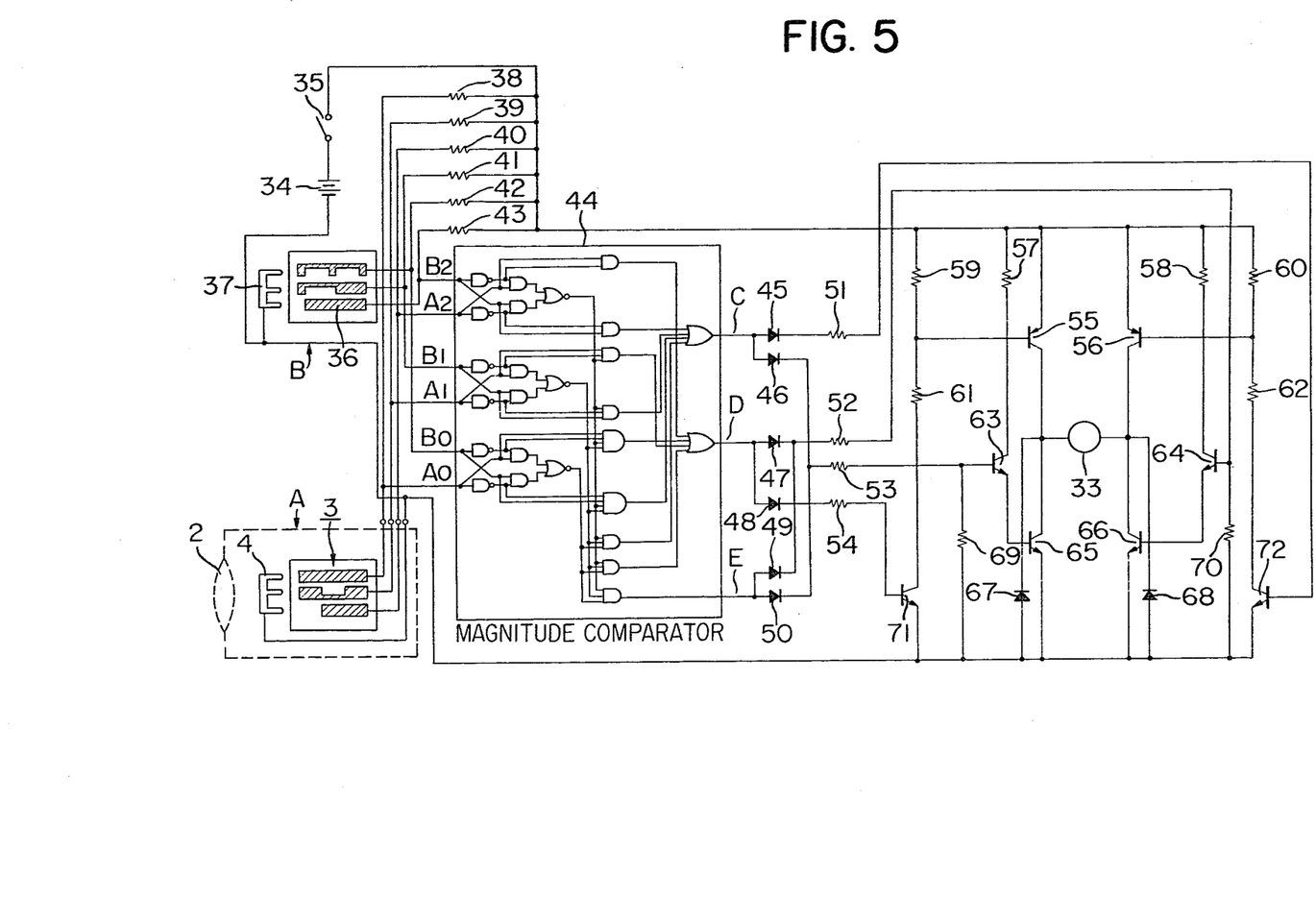
FIG. 5 is the diagram of an electric circuit thereof.

In FIG. 5 is shown the diagram of an electric circuit of the second embodiment. Reference numeral 2 designates a zoom lens; 3, a focal-length sensor; 4, a slider; 34, a power supply; 35, an on-off switch; 36, a position sensor for detecting the position of the movable hood 30; 37, a slider adapted to slide over the position sensor 36; 38, 39, 40, 41, 42 and 43, resistors; 44, a magnitude comparator for comparing the signal from the focal-length sensor 3 with the output signal from the hood position sensor 36; 45, 46, 47, 48, 49 and 50, reverse-current blocking diodes; 51, 52, 53 and 54, current-limiting resistors; 55, 56, 65 and 66, transistors which control the motor 33; 57, 58, 59, 60, 61 and 62, resistors; 63 and 64, transistors; 67 and 68, counterelectromotive force blocking diodes; 69 and 70, resistors; and 71 and 72, transistors.

The mode of operation of the circuit as shown in FIG. 5 will be described with further reference to FIGS. 6A to 6D. When the on-off switch 35 is closed, the focal-distance signal and the hood position signal as shown in FIGS. 6C and 6D, respectively, are derived depending upon the positions of the sliders 4 and 37, respectively, over the focal-length sensor 3 and the hood position sensor 36.

Figure 6A:
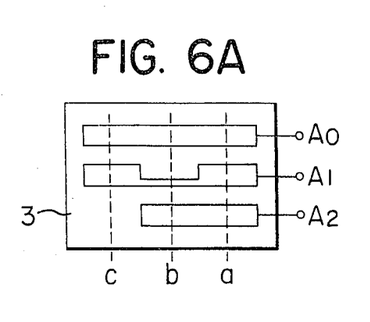
FIGS. 6A through 6D are views used to explain the mode of operation thereof; and shows a modification of the circuit shown in FIG. 5.
Figure 6B:
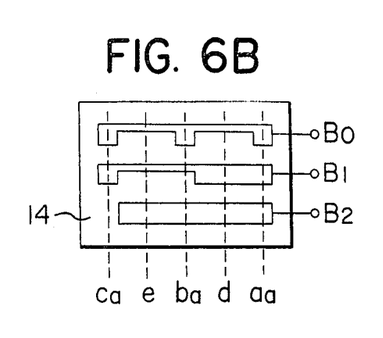
Figure 6C:
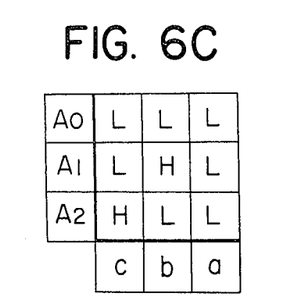
Figure 6D:
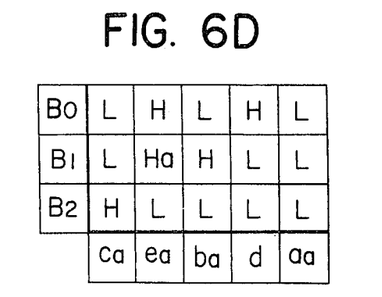

The sensors 3 and 36 have the conductor strip patterns as shown in FIGS. 6A and 6B, respectively, so that the outputs which appear at the terminals $A_0$, $A_1$ and $A_2$ and the terminals $B_0$, $B_1$ and $B_2$ vary in level depending upon the positions of the sliders 4 and 37.

Each of the low level signals L is assigned "0" whil each of the high level signals H, "2". The output $A_0$ ($B_0$) is raised to the power 0; the output $A_1$ ($B_1$), to the power 1; and the output $A_2$ ($B_2$), to the power 2. These output signals $A_0$ through $A_2$ are combined into the signal A as follows:

$$A=(A_0)^0+(A_1)^1+(A_2)^2$$

For instance, when the slider 4 is at the position c, $A_0$ is L, $A_1$ is L and $A_2$ is H, then $A_0=0$, $A_1=0$ and $A_2=2$, so that $$A=(0)^0+(0)^1+(2)^2=4$$

In like manner, the outputs $B_0$ through $B_2$ can be combined into the hood position signal B which in turn is compared with the focal-length signal A. The comparator 44 accomplishes the above-described digital processing and delivers a high level signal at the terminal C if $A>B$, at the terminal D if $A<B$ or at the terminal E if $A=B$.

Assume that the slider 4 is at the position a on the focal-length sensor 3 and the slider 37, at the position $c_a$ on the hood position sensor 36. Then, the focal-length signal A is $$A=(A_0=0)^0+(A_1=0)^1+(A_2=0)^2=0$$

and the hood position signal B $$B=(B_0=0)^0+(B_1=0)^1+(B_2=2)^2=4$$

Since $A<B$, the high-level signal H appears at the terminal D of the comparator 44 and is applied to the collector of the transistor 64. Then, the transistor 64 is turned on, so that the transistor 66 is turned on and simultaneously the transistor 71 is turned on. As a consequence, the transistor 55 is turned on, so that the current flows into the motor 33 through the transistors 55 and 66 and consequently the motor 33 is driven. The movable hood 30 is, therefore, moved backward, so that the slider 37 reaches the position e at which the hood position signal $B=3$ and still $A<B$. Consequently, the rotation of the motor 33 continues to further retract the movable hood 30, so that the slider 37 passes the positions $b_a$ and d at which the hood position signal B is 2 and still $A<B$. The motor 33 is, therefore, continuously driven to further retract the hood 30. When the slider 37 is brought to the position $a_a$, the hood position signal $B=0$ and, therefore, $A=B$, so that the high level signal appears at the output terminal E of the comparator 44. Then, the transistor 63 is turned on, so that the transistor 65 is turned on. The transistors 64 and 66 remain turned on, but since the output at the terminal D drops to a low level, the transistors 71 and 55 are turned off, so that no current flows through the motor 33 and consequently the motor 33 is stopped. Thus, the movable hood 30 and hence the projection or condenser lens 29 mounted thereon are moved back to the position at which the beam angle is adjusted optimum for the detected focal length.

Next, assume that the focal length of the zoom lens 2 is varied, so that the slider 4 is moved to the position b. Then, the focal-length signal A becomes:

$$A = (A_0=0)^0 + (A_1=2)^1 + (A_2=0)^2 = 2$$

Since the slider 37 remains at the position $a_a$, the position signal B=0. Hence, A>B so that the high-level signal appears at the output terminal C of the comparator 44. Then, the transistors 72, 56, 63 and 65 are turned on while the transistors 64 and 66 are turned off. The current flows into the motor 33 through the transistor 56 and out of it through the transistor 65, so that the motor 33 is rotated in the opposite direction to the direction when A<B and consequently the slider 37 is moved forward to the left in FIG. 6B. When the slider 37 is brought to the position $b_a$, the hood position signal B becomes 2 and hence A=B, so that the high-level signal appears at the output terminal E while the output signal at the terminal C drops and consequently the motor 33 is stopped. Thus, the slider 37 and hence the movable hood 30 with the projection or condenser lens 29 are moved by the distance equal to a distance between the positions $a_a$ and $b_a$.

Next, assume that the focal length of the zoom lens 2 be varied so that the slider 4 is moved to the position c. Then, the focal-length signal A becomes 4 ($A_0=0$, $A_1=0$, and $A_2=2$) while the hood position signal B remains 2. Since A>B, the output C goes high while the output E goes low, so that the motor 33 is reversed in rotation and consequently the slider 37 is moved forward. When it is brought to the position $c_a$, the hood position signal B=4 ($B_0=0$, $B_1=0$, $B_2=2$) and A=B. Then, the motor 33 is stopped so that the movable hood 30 is shifted by a distance equal to the distance between the positions $b_a$ and $c_a$.

It is assumed (a) that the focal length of the zoom lens 2 can be variable between 35 and 70 mm, (b) that the focal length is 50 mm and 60 mm, respectively, when the slider 4 is at the position I; that is, the boundary between the positions a and b and at the position II; that is, the boundary between the positions b and c, and (c) that the beam angle is broad, medium and narrow, respectively, when the slider 37 is at the positions $a_a$, $b_a$ and $c_a$. Then, when the focal length of the zoom lens 2 is between 35 and 49 mm, the beam angle is broad or wide; when the former is between 50 and 59 mm, the latter is medium or normal; and when the former is between 60 and 70 mm, the latter is narrow or telephoto. Thus, the beam angle of the flash unit 5 varies depending upon the focal length of the zoom lens 2.

So far, the variable focal length of the zoom lens 2 has been described as being divided into three sections; that is, between 35 and 49 mm; between 50 and 59 mm; and between 60 and 70 mm while the beam angle is switched between the broad, medium and narrow angles, but it is to be understood that the beam angle can be changed in more steps if the variable focal length is divided into more than three sections.

So far, the movable hood 30 has been described as being mounted on the flash unit 5, but it is to be understood that the movable hood 30 with the projection or condenser lens 29, the arm 31, the gear 32, teeth $31_a$, the motor 33 and a power supply for the motor 33 can be provided as an integral unit or adapter which can be detachably mounted on the flash unit 5.

Figure 7:
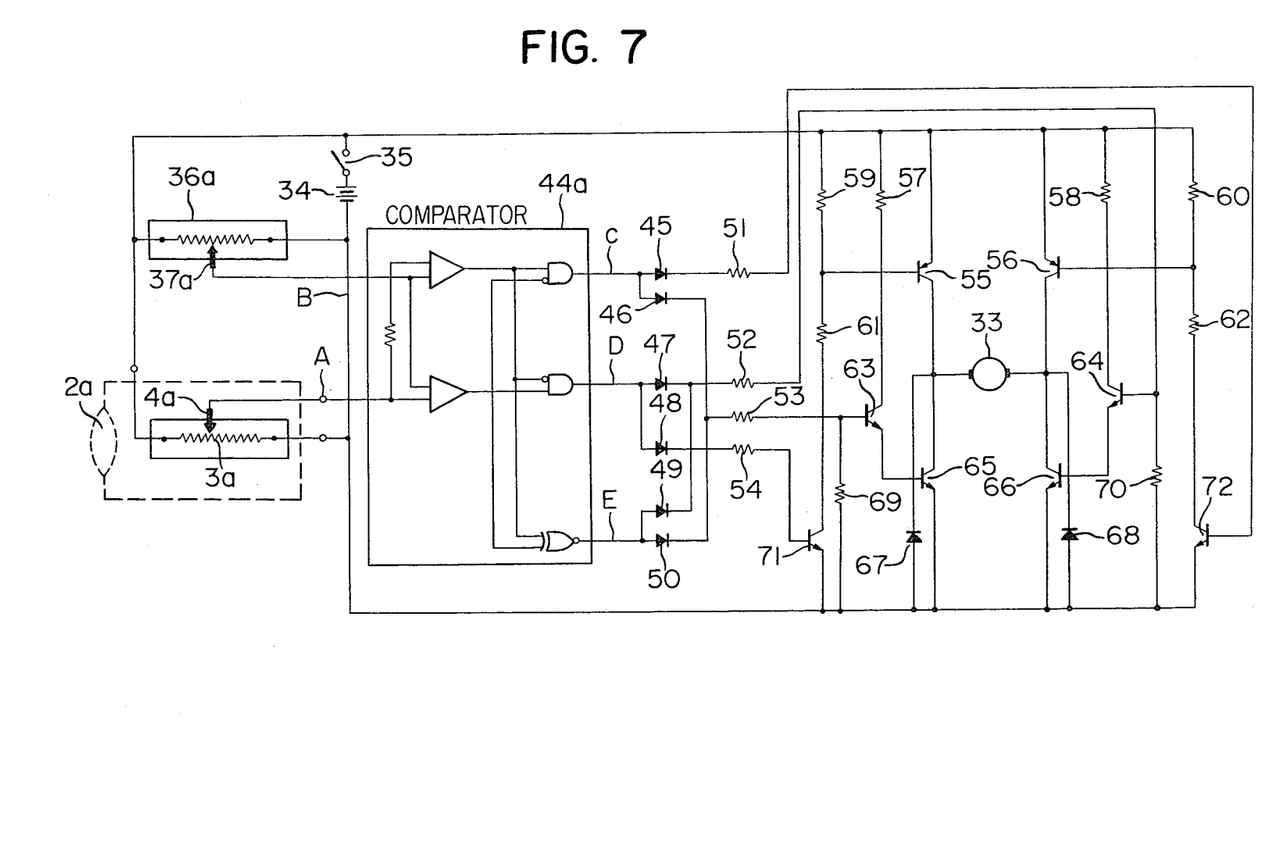

In FIG. 7 is shown a modification of the circuit as shown in FIG. 5. Reference numeral $2_a$ denotes a zoom lens; $3_a$, a focal-length sensor comprising a resistance wire or film; $4_a$, a wiper arm; $36_a$, a movable-hood position sensor comprising a resistance wire or film; $37_a$, a wiper arm; and $44_a$, a comparator for comparing the voltage output signal from the sensor $3_a$ with that from the sensor $36_a$.

When the on-off switch 35 is closed, the focal position signal A whose magnitude is depending upon the position of the wiper arm $4_a$ is applied to the comparator $44_a$. In like manner, the hood position signal B whose magnitude is depending upon the position of the wiper arm $37_a$ is applied to the comparator $44_a$. As with the second embodiment, the output C, D or E of the comparator $44_a$ goes high depending upon A>B, A<B or A=B. If A<B, the motor 33 is driven in one direction until A=B, but if A>B, the motor 33 is driven in the opposite direction until A=B. Thus, as with the second embodiment, the movable hood 30 is moved forward or backward in response to the variation in focal length of the zoom lens $2_a$, whereby the beam angle is varied accordingly.

In summary, according to the first or second embodiment of the present invention, the beam angle of the flash unit can be automatically varied optimumly in response to the variation in focal length of the zoom lens. As a consequence, as described previously, the use of prior art adapters can be eliminated and the manual setting of a projection or condenser lens is not needed. When the present invention is applied to the photographic equipment using a zoom lens, the misadjustment between the angle of view of the zoom lens and the beam angle of the flash unit can be avoided. As a consequence, the energy of flash light emitted from the flash unit can be fully utilized.

When a zoom lens of the type whose movable lens barrel must be rotated to obtain a desired angle of view is used or if interchangeable lens are used, the focal-length sensing means of the second embodiment or its modification can be suitably modified as described previously. In addition, the second embodiment or its modification as shown in FIG. 5 or 7 can be used in conjunction with the flash unit of the type as shown in FIG. 3.

What is claimed is:

1. A photographic equipment comprising
   (A) a beam-angle changing means comprising
      (a) a projection lens positioned in front of a flash lamp of an electronic flash unit,
      (b) a movable hood which supports said projection lens and which is movable toward or away from said flash lamp in the direction of the optical axis of the flashed light,
      (c) an electric motor, and
      (d) a transmission means which is interposed between said movable hood and said motor for translating the rotation of said motor into the linear movement of said movable hood;
   (B) a focal-length sensing means which is adapted to generate an electrical output signal which is representative of the focal length of a photographic lens used; and (C) a control means responsive to said electrical output signal from said focal-length sensing means for controlling said motor, whereby said movable hood is moved toward or away from said flash lamp of said electronic flash unit so that the beam angle thereof can be varied depending upon the focal length of said photographic lens used.

2. A photographic equipment as set forth in claim 1 further comprising said photographic lens used is a zoom lens; and said focal-length sensing means comprising a conductor pattern comprising a plurality of conductor strips, a slider which is adapted to slide over said conductor pattern for selective contact with one or more of said plurality of conductor strips thereof, and a cord for electrically interconnecting between said conductor pattern and said slider on the one hand and said electronic flash unit on the other hand, whereby as the focal length of said zoom lens is varied, said conductor pattern and said slider are moved relative to each other so that electrical digital signals representative of a varied focal length can be derived between said conductor pattern and said slider depending upon the state of electrical contact of said slider with said conductor strips of said conductor pattern.

3. A photographic equipment as set forth in claim 1 further comprising said photographic lens used is a zoom lens; and said focal-length sensing means comprising a variable resistor comprising a resistor element mounted on said zoom lens, and a contact means for contact with said resistor element, and a cord for electrically interconnecting between said variable resistor and said electronic flash unit, whereby as the focal length of said zoom lens is varied, said resistor element and said contact means are moved relative to each other so that the electrical analog signal representative of a varied focal length of said zoom lens can be derived from said variable resistor.

4. A photographic equipment as set forth in claim 1 further comprising said photographic lens used is an interchangeable lens with a predetermined focal length; and said focal-length sensing means comprising a fixed conductor pattern formed on said interchangeable lens and comprising a plurality of conductor strips, a slider which is adapted to contact with said conductor pattern for selective contact with one or more of said plurality conductor strips thereof, and a cord for electrically interconnecting between said conductor pattern and said slider on the one hand and said electronic flash unit on the other hand, whereby said focal-length sensing means generates electrical digital signals representative of said predetermined focal length of said interchangeable lens.

5. A photographic equipment as set forth in claim 1 wherein said photographic lens used is an interchangeable lens with a predetermined focal length; and said focal-length sensing means comprises a resistor mounted on said interchangeable lens, and a cord for electrically interconnecting between said resistor and said electronic flash unit, whereby said focal-length sensing means generates the electrical signal representative of a value of said resistor which in turn represents said predetermined focal length of said interchangeable lens.

6. A photographic equipment as set forth in claim 1, wherein said focal-length sensing means comprises an operating means mounted on said electronic flash unit, and an electric circuit disposed within said electronic flash unit and adapted to coact with said operating means to generate various electrical signals.

* * * * *